大专院校[54] METHOD OF TREATING EFFLUENTS CONTAINING SULFUR OXIDES

[75] Inventors: Takeo Odaka; Hiroichi Miyashita, both of Niihama, Japan

[73] Assignee: Sumitomo Metal Mining Company Limited, Tokyo, Japan

[21] Appl. No.: 714,259

[22] Filed: Mar. 21, 1985

[51] Int. Cl.$^4$ .......................... C02F 1/28; C01B 17/00
[52] U.S. Cl. ..................................... 210/760; 423/242
[58] Field of Search ................... 423/242 A; 210/712, 210/718, 750, 765, 760

[56] References Cited

U.S. PATENT DOCUMENTS

| | | | |
|---|---|---|---|
| 2,795,544 | 6/1957 | Williams et al. | 210/760 |
| 4,024,220 | 5/1977 | Ostroff et al. | 423/242 |
| 4,166,838 | 9/1979 | Tatani et al. | 423/242 |
| 4,255,257 | 3/1981 | Greiner et al. | 210/718 |

Primary Examiner—Gregory A. Heller
Attorney, Agent, or Firm—Watson, Cole, Grindle & Watson

[57] ABSTRACT

A method of treating effluents containing sulfur oxide ions, such as sulfite ions, thiosulfate ions, thionate ions and bisulfite ions, comprises blowing ozone-containing air into the effluent to reduce the COD level in the effluent to 6 mg/l or below, and neutralizing the so treated effluent with an alkali. This method is capable of producing neutral effluents with small equipment and within a short period of time, and the treated effluent will not experience an appreciable drop in the pH even if it is left to stand for a prolonged period.

6 Claims, No Drawings ns of the invention is to provide a method of treating effluents containing sulfur oxides that is free from the defects mentioned above and which is capable of producing neutral effluents with small equipment and within a short period of time.

METHOD OF TREATING EFFLUENTS CONTAINING SULFUR OXIDES

BACKGROUND OF THE INVENTION

1. Field of the Invention

The present invention relates to a method of treating effluents that contain sulfur oxide ions, such as sulfite ions, thiosulfate ions, thionate ion, bisulfite ion and which ions gradually become oxidized over the course of time to lower the pH of the effluent.

2. The Prior Art

Various kinds of effluents are known to contain sulfur oxides. For example, effluents resulting from flue gas desulfurization by the wet process contain sulfur oxides. Another source of effluents containing sulfur oxides is the flotation step wherein $SO_2$ is sometimes used to recover copper and zinc separately from complex sulfide ores. Part of the sulfur in the $SO_2$ gas used is oxidized to form, for example, thionate ions. When such effluents from the flotation step are discharged into rivers and other water courses, they initially assume weak alkalinity because of the reagents used in the flotation step. However, during the course of several to several tens of days following discharge into rivers, the flowing or standing effluents are gradually oxidized to reduce the pH of the water in the rivers until it becomes acidic and provides a condition unfavorable to the growth of organisms.

In order to prevent this problem, the effluents from the flotation step are conventionally left to stand within sedimentation ponds or dams until the pH of the effluents is reduced to the acidic range. Only thereafter are the effluents neutralized with alkali agents to provide pHs suitable for discharge into water courses. However, this method requires not only large sedimentation ponds or dams but also a prolonged period of treatment.

SUMMARY OF THE INVENTION

The principal object of the present invention is to provide a method of treating effluents containing sulfur oxides that is free from the defects mentioned above and which is capable of producing neutral effluents with small equipment and within a short period of time.

Noting that the primary reason for the decrease in the pH of effluents from the flotation step after being discharged into water courses is the oxidation of sulfureous compounds such as sulfurous acid, thiosulfuric acid, thionic acid and bisulfurous acid in the effluents, though the sulfate in the effluents is no more oxidized so that it does not affect the decrease in the pH of effluents, the present inventors made various studies on a method of accelerating this oxidation reaction. As a result, the inventors found that if the effluents are neutralized with an alkali after their COD level is reduced to 6 mg/l or below by blowing in an ozone and air combination as an oxidizer, the effluents can thereafter be left to stand without experiencing an appreciable decrease in pH. The present invention has been accomplished on the basis of this finding.

DETAILED DESCRIPTION OF THE INVENTION

For the purpose of the present invention, it is essential that the COD level of the effluent to be treated is reduced to 6 mg/l or below by blowing in ozone together with air. As will be shown in the following Examples, if the COD level of the effluent treated with ozone is higher than 6 mg/l, even subsequent neutralization is unable to prevent the effluent from becoming highly acidic when left to stand for an extended period. If the COD level of the ozone-treated effluent is 6 mg/l or below, it is generally assured that the pH of the effluent will not decrease to lower than 6.5, even if it is left to stand after neutralization. The blowing of ozone does not produce any appreciable effect after the COD level is reduced to lower than 3 mg/l. Therefore, ozone is preferably blown into the effluent for such a period of time that its COD (chemical oxygen demand) level assumes a value between 3 and 6 mg/l.

In the practice of the method of the present invention, an effluent containing sulfur oxide ions, such as sulfite ions, thiosulfate ions, thionate ions and bisulfite ions is placed in a vessel such as a reaction column and an azone-containing air is blown into the effluent. It is preferred that the vapor-liquid contact between ozone and effluent be extended as long as possible in order to enhance the efficiency of the reaction with ozone. The desired COD level ($\leq 6$ mg/l) in the effluent can be obtained with relative ease by empirical assumption of the volume of ozone to be blown in and the duration of ozone treatment on the basis of the COD levels in untreated effluents.

The following examples are provided as further illustrations of the invented method and are not to be construed as limiting.

EXAMPLE 1

The effluents to be treated in this Example were obtained by flotation-concentrating complex ores containing copper, zinc and iron sulfides that were excavated at mine A, Canada. The effluents contained 1300 mg/l of $SO_4^{--}$, 65 mg/l of $S_2O_3^{--}$ and 84 mg/l of $SO_3^{--}$ and had a pH of 8.5 and a COD level of 48 mg/l. A 1500-ml sample of such effluents was charged into an ozone reaction column (55 mm$^\phi$ and 1145 mm$^H$). Air containing 0.43 vol% of ozone was blown into the reactor from below for a period of 40 minutes until the COD level was reduced to 5.8 mg/l and the pH to 2.1. The effluents were then recovered from the reactor and mixed with slaked lime under agitation to increase the pH to 8.6. A sample of the filtrate was placed in a 500-ml beaker and left to stand for a predetermined period in order to check the time-dependent change in the pH of the effluent. A sample of the raw effluents having a pH of 8.5 was also left in a beaker for the same period. The pH profile for the two samples is shown in Table 1 below.

TABLE 1

| | Days past | | | | |
|---|---|---|---|---|---|
| | 0 | 2 | 5 | 30 | 83 |
| Ozone-treated sample | 8.6 | 6.5 | 6.6 | 6.7 | 6.6 |
| Untreated sample | 8.6 | 4.8 | 3.0 | — | — |

EXAMPLE 2

A sample of the same effluent as was used in Example 1 was adjusted to a pH of 11.1 by addition of slaked lime in order to enhance the efficiency of the subsequent reaction with ozone. As in Example 1, the sample was charged into an ozone reactor. Fifteen minutes from the start of ozone blowing, the COD level of the effluent had been reduced to 5.9 mg/l and the pH to 2.5. The effluent was recovered from the reactor and mixed with slaked lime under agitation to increase the pH to 8.8. A sample of the filtrate was placed in a beaker and left to stand for a predetermined period in order to check the time-dependent change in the pH of the effluent. A sample of the raw effluent whose pH was adjusted to 11.1 was also left in a beaker for the same period. The pH profile for the two samples is shown in Table 2 below.

TABLE 2

|  | Days past | | | | | |
| --- | --- | --- | --- | --- | --- | --- |
|  | 0 | 2 | 5 | 12 | 30 | 83 |
| Ozone-treated sample | 8.8 | 7.6 | 7.2 | 7.3 | 7.2 | 7.2 |
| Untreated sample | 11.1 | 8.7 | 7.4 | 3.8 | 3.2 | 3.2 |

The results in Examples 1 and 2 show that the untreated sample experienced a significant drop in pH when it was left to stand after neutralization with slaked lime, whereas the pH of the ozone-treated sample was not appreciably decreased after prolonged standing.

EXAMPLE 3

The effluents to be treated in this Example were obtained by flotation-concentrating complex ores containing copper, zinc and iron sulfides that were excavated at mine A, Canada. The effluents contained 1500 mg/l of $SO_4^{--}$, 70 mg/l of $SO_3^{--}$ and 80 mg/l of $SO_3$ and had a pH of 8.4 and a COD level of 48.5 mg/l. Samples of such effluents each weighing 1,500 ml were charged into ozone reactors having the same dimensions as in Example 1. Air containing 0.43 vol% of ozone was blown into the reactors for different periods of time ranging from 5 to 60 minutes. The treated samples were recovered from the respective reactors and checked for their COD levels. Subsequently, the samples were neutralized with slaked lime to pH values in the range of 8.1 and 8.5. Filtrates of the respective samples were then left in 500-ml beakers for a predetermined period in order to check the time-dependent change in the pH of the effluents. The results are shown in Table 3 below.

TABLE 3

| Duration of ozone treatment (min) | COD (mg/l) | Days past | | | | | | |
| --- | --- | --- | --- | --- | --- | --- | --- | --- |
|  |  | 0 | 2 | 5 | 10 | 12 | 30 | 83 |
| Untreated | 48.5 | 8.4 | 4.5 | 4.0 | 3.6 | 3.4 | 2.9 | 2.7 |
| 10 | 23.9 | 8.3 | 4.4 | 4.0 | 3.5 | 3.3 | 3.0 | 3.1 |
| 20 | 15.5 | 8.4 | 4.8 | 4.3 | 4.1 | 3.8 | 3.4 | 3.3 |
| 25 | 10.3 | 8.1 | 5.8 | 5.1 | 4.9 | 4.9 | 5.1 | 5.0 |
| 30 | 7.2 | 8.2 | 7.1 | 6.7 | 6.6 | 6.6 | 6.1 | 5.9 |
| 40 | 5.1 | 8.5 | 7.2 | 7.0 | 7.1 | 7.0 | 7.0 | 7.2 |
| 50 | 3.8 | 8.3 | 7.3 | 7.1 | 7.1 | 7.0 | 7.1 | 7.0 |
| 60 | 3.0 | 8.3 | 7.2 | 7.2 | 7.3 | 7.1 | 7.2 | 7.2 |

The data in Table 3 show that the drop in the pH of the effluents during prolonged standing can be substantially prevented by blowing in ozone to give COD levels not higher than 6.0 mg/l.

What is claimed is:

1. A method of treating an effluent containing sulfur oxide ions so that it will be provided with a basic pH that will be maintained over a long period of time, said method comprising the steps of
   (a) blowing into said effluent a sufficient amount of a mixture of air and ozone that the COD level of said effluent will be reduced to 6 mg/l or below, and
   (b) adding an alkali to said effluent obtained in step (a) to provide it with a basic pH.

2. The method as defined in claim 1, wherein in step (a) said COD level is reduced to between 3 and 6 mg/l.

3. The method as defined in claim 1, wherein said mixture of said air and ozone used in step (a) contains about 0.43 volume % of ozone.

4. The method as defined in claim 1, wherein said alkali used in step (6) is slaked lime.

5. The method as defined in claim 1, wherein said sulfur oxide ions are selected from the group consisting of sulfite ions, thiosulfate ions, thionate ions and bisulfite ions.

6. A method of disposing of an effluent containing sulfur oxide ions so that it will be provided with a basic pH that will be maintained over a long period of time, said method comprising the steps of
   (a) blowing into said effluent a sufficient amount of a mixture of air and ozone that the COD level of said effluent will be reduced to 6 mg/l or below,
   (b) adding an alkali to said effluent obtained in step (a) to provide it with a basic pH, and
   (c) discharging said effluent obtained in step (b) into a water course.

* * * * *

UNITED STATES PATENT AND TRADEMARK OFFICE
CERTIFICATE OF CORRECTION

PATENT NO. : 4,584,107
DATED : April 22, 1986
INVENTOR(S) : Takeo Odaka et al.

It is certified that error appears in the above-identified patent and that said Letters Patent is hereby corrected as shown below:

Title page, the following should be added:

[30]  Foreign Application Priority Data

March 26, 1984 [JP] Japan ............. 56252/59

Signed and Sealed this

Fifteenth Day of July 1986

[SEAL]

Attest:

DONALD J. QUIGG

Attesting Officer

Commissioner of Patents and Trademarks